United States Patent
Toda

(10) Patent No.: US 11,097,675 B2
(45) Date of Patent: Aug. 24, 2021

(54) VEHICULAR POWER SUPPLY SYSTEM

(71) Applicant: YAZAKI CORPORATION, Tokyo (JP)

(72) Inventor: Takafumi Toda, Shizuoka (JP)

(73) Assignee: YAZAKI CORPORATION, Tokyo (JP)

(*) Notice: Subject to any disclaimer, the term of this patent is extended or adjusted under 35 U.S.C. 154(b) by 0 days.

(21) Appl. No.: 16/299,132

(22) Filed: Mar. 11, 2019

(65) Prior Publication Data

US 2019/0283696 A1 Sep. 19, 2019

(30) Foreign Application Priority Data

Mar. 13, 2018 (JP) .............................. JP2018-045874

(51) Int. Cl.
*B60R 16/03* (2006.01)
*B60L 1/00* (2006.01)
(Continued)

(52) U.S. Cl.
CPC ............... *B60R 16/03* (2013.01); *B60L 1/00* (2013.01); *H02J 1/08* (2013.01);
(Continued)

(58) Field of Classification Search
CPC .............. B60R 16/033; B60R 16/0307; B60R 16/03–04; B60L 1/00; B60L 3/0046;
(Continued)

(56) References Cited

U.S. PATENT DOCUMENTS

| 2002/0113492 A1* | 8/2002 | Sakamoto | H02J 1/06 307/10.1 |
| 2003/0098211 A1* | 5/2003 | Saito | B60R 16/0315 191/3 |

(Continued)

FOREIGN PATENT DOCUMENTS

| JP | 6-70459 A | 3/1994 |
| JP | 2015-113101 A | 6/2015 |

(Continued)

OTHER PUBLICATIONS

The extended European Search Report for the related European Patent Application No. 19162413.9 dated Apr. 24, 2019.

*Primary Examiner* — Hal Kaplan
*Assistant Examiner* — David A Shiao
(74) *Attorney, Agent, or Firm* — Kenealy Vaidya LLP

(57) ABSTRACT

A vehicular power supply system includes a first power supply mounted on a vehicle, a first power supply line connected to the first power supply and disposed on one side in a width direction or a front-rear direction of the vehicle, a second power supply mounted on the vehicle, that is different from the first power supply, a second power supply line connected to the second power supply and disposed on another side in the width direction or the front-rear direction of the vehicle, a third power supply line in which one end is connected to the first power supply line and another end is connected to the second power supply line, and a power semiconductor that switches between short-circuiting and opening of the third power supply line.

11 Claims, 5 Drawing Sheets

(51) Int. Cl.
*H02J 1/08* (2006.01)
*B60L 3/00* (2019.01)
*B60R 16/033* (2006.01)
*B60R 16/04* (2006.01)
*G05F 1/56* (2006.01)
*B60K 1/04* (2019.01)

(52) U.S. Cl.
CPC ..... *B60K 2001/0405* (2013.01); *B60L 3/0007* (2013.01); *B60L 3/0046* (2013.01); *B60R 16/033* (2013.01); *B60R 16/0307* (2013.01); *B60R 16/04* (2013.01); *G05F 1/56* (2013.01)

(58) Field of Classification Search
CPC .. B60L 3/0007; B60L 3/04; G05F 1/56; H02J 1/08; H02J 1/084–086; H02J 2310/46; B60K 2001/0405–0416; B60K 2028/006
See application file for complete search history.

(56) References Cited

U.S. PATENT DOCUMENTS

| | | | |
|---|---|---|---|
| 2005/0275289 A1* | 12/2005 | Jabaji | H02J 7/1423 307/10.1 |
| 2007/0247003 A1* | 10/2007 | Elder | B60L 58/10 307/10.1 |
| 2007/0257557 A1* | 11/2007 | Gors | B60R 21/017 307/10.1 |
| 2008/0265975 A1* | 10/2008 | Takasu | H03K 17/6877 327/374 |
| 2015/0291039 A1 | 10/2015 | Sakata et al. | |
| 2016/0134275 A1* | 5/2016 | Serizawa | H02J 1/10 307/130 |
| 2017/0015262 A1* | 1/2017 | Kikuchi | B60R 16/033 |
| 2017/0166145 A1* | 6/2017 | Kinoshita | F02P 7/077 |
| 2018/0001850 A1 | 1/2018 | Kontani | |
| 2018/0019616 A1* | 1/2018 | Yasunori | H02J 50/10 |
| 2019/0071038 A1 | 3/2019 | Maekawa | |
| 2019/0097453 A1* | 3/2019 | Saito | H02J 7/34 |
| 2019/0296541 A1* | 9/2019 | Mensch | H01H 89/00 |
| 2020/0094758 A1* | 3/2020 | Kawakami | H02J 9/068 |
| 2020/0317059 A1* | 10/2020 | Mikami | B60L 3/003 |

FOREIGN PATENT DOCUMENTS

| | | |
|---|---|---|
| JP | 2017-177857 A | 10/2017 |
| WO | 2010/136863 A1 | 12/2010 |
| WO | 2017/159308 A1 | 9/2017 |

\* cited by examiner

VEHICULAR POWER SUPPLY SYSTEM

CROSS REFERENCE TO RELATED APPLICATIONS

This application claims priority from Japanese Patent Application No. 2018-045874 filed on Mar. 13, 2018, the entire contents of which are incorporated herein by reference.

BACKGROUND OF THE INVENTION

Field of the Invention

The present invention relates to a vehicular power supply system having a plurality of power supplies in a vehicle such as an automobile.

Description of Related Art

In recent years, installation of an automatic driving system has been studied variously in vehicles such as automobiles. For example, it is studied to detect the running position and running state of a vehicle and the driving state of a driver and warn the driver according to the state. In addition, it is also studied that the vehicle autonomously controls the driving of the vehicle by always detecting the driving environment without being directly driven by the driver. In order to mount such an automatic driving system on a vehicle, it is necessary to simultaneously study the technical contents thereof and basic technologies that support the technology.

One of the fundamental technologies is a vehicular power supply system. The above-described automatic driving system is realized by electric actuators such as motors, and many electronic components and electronic devices for controlling the motors. Therefore, in order to ensure the safety of the vehicle on which the automatic driving system is mounted all the time, reliability of the vehicular power supply system for supplying electricity is also strongly required.

As a vehicular power supply system related to an automatic driving system in related art, there is known a power supply system including a sub-power supply system having a lithium-ion battery in addition to a main power supply system having a generator such as an alternator, and a lead battery (see, for example, the patent document 1: JP-A-2017-177857). In the main and sub-power supply systems, power supply lines are connected to the respective power supplies, and independent power supply systems are constructed. Also, in the main power supply system, independent power supply systems are constructed between the generator and the lead battery.

Devices and accessories related to the automatic driving system, for example, an electric power steering system, an anti-lock brake system, an advanced exercise support system are preferentially connected to the sub-power supply system, and electricity is supplied to these devices from a power supply (lithium-ion battery) of the sub-power supply system. As a result, the reliability of the vehicular power supply system for the automatic driving system may be maintained.

A lithium-ion battery is basically mounted as a power supply for a traveling motor mounted on an electric vehicle or a hybrid vehicle, but a part of the traveling power supply is used as a power supply of an automatic driving system. [Patent Document 1] JP-A-2017-177857

Here, a vehicular power supply system 5 (hereinafter, also referred to as the invention of related art) invented by the inventors of the present invention related to an automatic driving system will be described with reference to FIG. 5. FIG. 5 is a schematic configuration diagram illustrating the vehicular power supply system 5 of the invention of related art.

In the vehicle V illustrated in FIG. 5, a lithium-ion battery 60 to be described later is mounted as a power supply for a traveling motor. A part of the power supply of the lithium-ion battery 60 is used as a power supply for backup of the automatic driving system.

In FIG. 5, the layout of the system will be described by dividing the vehicle V into three sections of an engine compartment, a floor, and a rear in a front-rear direction of the vehicle, further dividing each section into two in the vehicle width (left and right) direction to set a total of six sections. That is, total of six sections are set, a section A1 is a left-side section of the engine compartment, a section A2 is a right-side section of the engine compartment, a section A3 is a left-side section of the floor, a section A4 is a right-side section of the floor, a section A5 is a left-side section of the rear, and a section A6 is a right-side section of the rear.

As illustrated in FIG. 5, the vehicular power supply system 5 of the invention of related art includes, as a main power supply system, an alternator 51 (first power supply) which is a generator, a lead battery 52 (second power supply) which is a storage battery, and a plurality (six in the present invention) of electrical connection boxes 53, 54, 55, 56, 57, and 58 for delivering electricity to each device (not illustrated) and accessories mounted on the vehicle V and relaying electricity to other electrical connection boxes. In the invention of related art, both the alternator 51 and the lead battery 52 are disposed in the section A1 and are disposed close to each other.

The vehicular power supply system 5 of the invention of related art further includes, as a sub-power supply system, the lithium-ion battery 60 (third power supply) which is a storage battery, a DC/DC converter 61 for converting the voltage of the lithium-ion battery 60, and an electric distribution box 62 for receiving electricity whose voltage is converted by the DC/DC converter 61.

Power supply lines W are disposed between the equipment 51, 52, 60, and 61 and the electric boxes 53, 54, 55, 56, 57, 58, and 62, respectively, and are electrically connected.

Among a plurality of electrical connection boxes 53, 54, 55, 56, 57, and 58 of the main power supply system, the first electrical connection box 53 is disposed in the section A1, the second electrical connection box 54 is disposed in the section A2, the third electrical connection box 55 is disposed in the section A3, the fourth electrical connection box 56 is disposed in the section A4, the fifth electrical connection box 57 is disposed in the section A5, and the sixth electrical connection box 58 is disposed in the section A6.

The first to third electrical connection boxes 53, 54, and 55 are disposed so as to directly receive electricity from the alternator 51 and the lead battery 52 via the relay circuit 59. The third electrical connection box 55 relays and delivers electricity to the fourth and fifth electrical connection boxes 56 and 57. Furthermore, the fourth electrical connection box 56 relays and delivers the electricity relayed from the third electrical connection box 55 to the sixth electrical connection box 58 in the same manner. In this way, the first to sixth electrical connection boxes 53, 54, 55, 56, 57, and 58 are disposed so as to receive electricity in two systems directly or through relay from the alternator 51 and the lead battery 52.

The electric distribution box 62 of the sub-power supply system individually delivers electricity from the lithium-ion battery 60 to the first to sixth electrical connection boxes 53, 54, 55, 56, 57, and 58. That is, overall, the first to sixth electrical connection boxes 53, 54, 55, 56, 57, and 58 are supplied with electricity in a total of 3 (2+1) systems, with two systems in the main power supply system and one system in the sub-power supply system.

By the way, in the vehicular power supply system 5 of related art as illustrated in FIG. 5, the power supply lines W in the main power supply system are often routed in parallel on the vehicle. That is, as illustrated in FIG. 5, the power supplies of the alternator 51 which is the first power supply and the lead battery 52 which is the second power supply are disposed relatively close to each other in the vehicle, and the power supply lines W are routed so as to connect a plurality of electrical connection boxes 53, 54, 55, 56, 57, and 58 used in the main power supply system in parallel.

Therefore, along with the vehicle crash, there is a possibility that both the first and second power supplies 51 and 52 routed in parallel in the vehicle and the power supply lines W thereof are broken or damaged. At this time, if there is no sub-power supply system described above, no electricity is supplied to the vehicular devices, accessories, and the like, and the automatic driving system may not function at the same time. For example, electric power is no longer supplied to devices and accessories specifically, drive system devices such as an electric power steering device and an anti-lock brake system, that directly affect vehicle safety related an automatic driving system, there is a possibility that the safety of the vehicle may be significantly impaired.

Therefore, focusing on this simultaneous breakage the present inventors have made intensive studies. As a result, in order to prepare for the risk of simultaneous breakage of the first and second power supplies 51 and 52, and the power supply lines W thereof, the inventors of the present invention have obtained a new idea that the lithium-ion battery 60 which is originally intended for traveling may also be redundantly incorporated as a sub-power supply system for an automatic driving system. That is, the inventors discovered that if it is possible to reduce the risk of simultaneous breakage in the first and second power supplies 51 and 52, it is possible to eliminate the need for a sub-power supply system.

However, even if the sub-power supply system as illustrated in FIG. 5 is simply made unnecessary, in order to guarantee the reliability of the system, even if one of the first and second power supplies 51 and 52 and the power supply lines W thereof is damaged or broken, means for supplying electricity back-up from the other remaining power supplies 51 and 52 should also be considered at the same time. That is, the inventors of the present invention also studied a configuration in which the two power supplies 51 and 52 and the power supply lines W thereof are complementary to each other. As a result, the present inventors discussed that the reliability of the system may be maintained by effectively utilizing remaining power.

As described above, since the first and second power supplies 51 and 52 and the power supply lines W thereof are separately and independently constructed in the above-described main power supply system, the power supply lines W are individually routed and connected to the devices and equipment in the respective power supplies 51 and 52. Therefore, there is a possibility that the power supply lines W used in the vehicle becomes longer as necessary. As a result, the routing of power supply lines becomes complicated and the weight of the vehicle is increased, and there is room for improvement.

SUMMARY

One or more embodiments provide a vehicular power supply system capable of reducing a risk of breakage or damage of both a first and second power supplies and the power supply lines even if a vehicle crashes and to realize complementarity between these power supply systems to improve a power supply redundancy of the systems, and reducing a number of power lines to be used and simplify a routing thereof and reduce weight and cost of the systems.

In an aspect (1), a vehicular power supply system includes a first power supply mounted on a vehicle, a first power supply line connected to the first power supply and disposed on one side in a width direction or a front-rear direction of the vehicle, a second power supply mounted on the vehicle, that is different from the first power supply, a second power supply line connected to the second power supply and disposed on another side in the width direction or the front-rear direction of the vehicle, a third power supply line in which one end is connected to the first power supply line and another end is connected to the second power supply line, and a power semiconductor that switches between short-circuiting and opening of the third power supply line.

In an aspect (2), the power semiconductor includes a forward power MOSFET and a reverse power MOSFET. One of the forward power MOSFET and the reverse power MOSFET is provided on one end side of the third power supply line and the other of the forward power MOSFET and the reverse power MOSFET is provided on another end side of the third power supply line.

In an aspect (3), the vehicular power supply system further includes a first electrical connection box electrically connected to the first power supply and provided with one of the forward power MOSFET and the reverse power MOSFET, and a second electrical connection box electrically connected to the second power supply and provided with the other of the forward power MOSFET and the reverse power MOSFET.

In an aspect (4), electricity is supplied to a plurality of accessories mounted on the vehicle. At least a part of the plurality of accessories is positioned so that the electricity is supplied from both of the first electrical connection box and the second electrical connection box.

In an aspect (5), the vehicular power supply system further includes control units generating command values to the power semiconductor so as to switch between short-circuiting and opening of the third power supply line, according to a detected faulty part of the vehicle, a damage state of the first power supply or the second power supply, or a breakage state of the first power supply line or the second power supply line. The power semiconductor switches between short-circuiting and opening of the third power supply line according to the command values of the control units.

In the aspect (1), even if the vehicle crashes, it is possible to reduce the risk of breakage or damage of both the first and second power supplies and the power supply lines and to realize complementarity between these power supply systems to improve the power supply redundancy of the systems, and it is possible to reduce the number of power lines to be used and simplify the routing thereof and reduce weight and cost of the systems.

In the aspect (2), a large capacity of electricity may be supplied quickly from the other power supply through the third power supply line.

In the aspect (3), it is possible to distribute electricity from the other power supply to the plurality of accessories, the device, or the like connected to the electrical connection boxes.

In the aspect (4), for example, when the accessory is a system highly related to an automatic driving system, an electric power steering system, an anti-lock brake system, an advanced exercise support system, or the like, electricity is directly supplied from the other power supplies even if electricity supply from one of the power supplies is disabled. As a result, it is possible to avoid the stoppage of the automatic driving system as much as possible regardless of damage or breakage state.

In the aspect (5), since the control unit appropriately switches between short-circuiting and opening of the power semiconductor according to the faulty parts, the damage or the breakage state, unnecessary switching of the power semiconductor may be suppressed.

According to the vehicular power supply system of the present invention, even if the vehicle crashes, it is possible to reduce the risk of breakage or damage of both the first and second power supplies and the power lines thereof and to realize complementarity between these power supply systems to improve the power supply redundancy of the system. It is possible to reduce the number of electric lines to be used and to simplify the routing and to reduce the weight and cost of the system.

The present invention has been briefly described above. The details of the present invention will be further clarified by reading an embodiment (hereinafter, referred to as "embodiment") for carrying out the invention described below with reference to the accompanying drawings.

DETAILED DESCRIPTION

Hereinafter, specific embodiments of a vehicular power supply system according to the present invention will be described with reference to drawings.
<Configuration of Vehicular Power Supply System>

Figure 1:
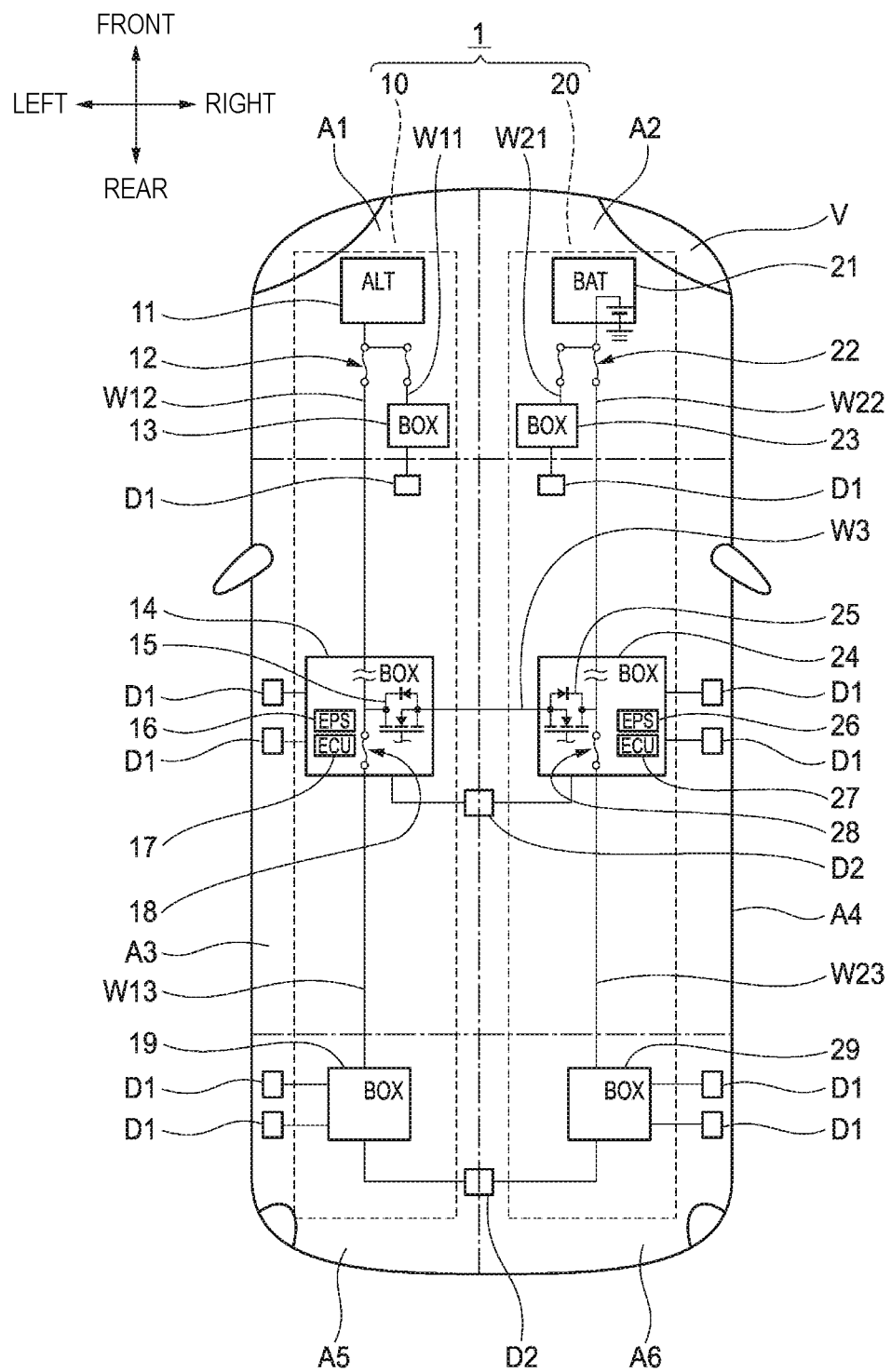
FIG. 1 is a schematic configuration diagram illustrating a vehicular power supply system according to an embodiment.

The configuration of a vehicular power supply system of the present embodiment will be described with reference to FIG. 1. FIG. 1 is a schematic configuration diagram illustrating the vehicular power supply system 1 according to the present embodiment.

In FIG. 1, the layout of the system will be described by dividing a vehicle V into three sections in an engine compartment, a floor, and a rear in a front-rear direction of the vehicle, further dividing each section into two in the vehicle width (left and right) direction to set a total of six sections. That is, total of six sections are set, a section A1 is a left side section of the engine compartment, a section A2 is a right-side section of the engine compartment, a section A3 is a left side section of the floor, a section A4 is a right-side section of the floor, a section A5 is a left-side section of the rear section, and a section A6 is a right-side section of the rear.

FIG. 1 schematically illustrates forward and reverse power MOSFETs 15 and 25 which will be described later, but an electric circuit (not illustrated) for applying a predetermined voltage is also provided for each of these power MOSFETs 15 and 25 so that power MOSFETs may be controlled to be turned on and off, respectively by the electronic control units 17 and 27 to be described later.

As illustrated in FIG. 1, the vehicular power supply system 1 of the present embodiment is mounted in the vehicle V such as an automobile, is configured with two systems of a first power supply system 10 and a second power supply system 20, and supplies electric power to accessories D1 and D2 and the like which will be described later. The first and second power supply systems 10 and 20 are disposed in parallel with each other along the front-rear direction of the vehicle. Specifically, the first power supply system 10 is disposed on the left side of the vehicle, that is, in the sections A1, A3, and A5. The second power supply system 20 is disposed on the right side of the vehicle, that is, in the sections A2, A4, and A6.

The one indicated by the reference "D1" of the accessories means the accessory that is supplied with electricity only from one of the first and second power supply systems 10 and 20. Equipment related to a traveling system, such as a light, a meter, an air conditioner, an alarm, and the like corresponds to the accessory D1. On the other hand, the one indicated by reference "D2" means the accessory that is supplied with electricity from both the first and second power supply systems 10 and 20. The accessory D2 corresponds to devices and equipment constituting accessories related to a drive system, for example, a system highly related to an automatic driving system, an electric power steering system, an anti-lock brake system, an advanced exercise support system, or the like.

The first power supply system 10 is configured to include an alternator 11 (first power supply), a relay circuit 12, first, second, and third electrical connection boxes 13, 14, and 19, first and second power supply lines W11 and W12 for electrically connecting the alternator 11 and the first and second electric connection boxes 13 and 14, respectively, and a third power supply line W13 for electrically connecting the alternator 11 and the second and third electric connection boxes 14 and 19.

The alternator 11 of the first power supply system 10 is disposed in the section A1 and is driven to rotate by an engine (not illustrated) to generate electricity and supply electricity. In the alternator 11, a DC/DC converter (not illustrated) is internally mounted or externally mounted and electrically connected. The electricity of the alternator 11 is converted into a desired voltage value by the DC/DC converter and supplied to the inside of the vehicle.

The alternator 11 is used as a main power supply and also supplies electricity to the second power supply system 20.

The first electrical connection box 13 of the first power supply system 10 is disposed in the section A1, is connected to the alternator 11 via the relay circuit 12 and the first power supply line W11, and is directly supplied with electricity from the alternator 11. The accessory D1 is connected to the first electrical connection box 13, and the first electrical connection box 13 supplies electricity to the accessory D1.

The second electrical connection box 14 of the first power supply system 10 is disposed in the section A3, is connected to the alternator 11 via the relay circuit 12 and the second power supply line W12, and is directly supplied with electricity from the alternator 11. The accessory D1 and the accessory D2 are connected to the second electrical connection box 14, and the second electrical connection box 14 supplies electricity to both the accessory D1 and the accessory D2.

The accessory D2 is also electrically connected to a second electric connection box 24 of the second power supply system 20 to be described later and is provided so as to be supplied with electricity from the second power supply system 20.

The second electrical connection box 14 includes the forward power MOSFET 15 constructing a part of the power semiconductor, a power supply control device 16 (control unit), an electronic control unit 17 (control unit), and a relay circuit 18.

The relay circuit 18 is incorporated in the second electric connection box 14 and is connected to one end side (the upper end side in FIG. 1) of the third power supply line W13. The power supply control device 16 is a control device for distributing and supplying a predetermined amount of the electricity to be received to each device, the accessories D1 and D2, and the like.

The forward power MOSFET 15 includes a diode element, may cope with a large capacity of electric power, and has a high switching speed. The forward power MOSFET 15 functions as one electric switch for short-circuiting or opening electricity together with the reverse power MOSFET 25 of the second power supply system 20 to be described later. That is, if both the forward power MOSFET 15 and the reverse power MOSFET 25 are used to be opened by being turned off, electricity may be cut off between the first power supply system 10 and the second power supply system 20, and if both are short-circuited by being turned on, electricity is supplied between the first power supply system 10 and the second power supply system 20.

Various detection signals from a sensor (not illustrated) mounted on the vehicle are input to the electronic control unit 17. A part of the sensor has a function of monitoring a damage state of the alternator 11, a lead battery 21 and the like which will be described later, a breakage state of the power supply lines W11, W12, W13, W21, W22, and W23, those faulty parts, and the like. The electronic control unit 17 generates a command value as to whether to short-circuit or open the power semiconductor (forward power MOSFET 15 and reverse power MOSFET 25) according to the damage state of the power supplies 11 and 21 detected by the sensor, the breakage state of the power supply lines W11, W12, W13, W21, W22, and W23 or faulty parts.

A device on which this command value generating function is installed is not limited to the electronic control unit 17 as long as the device is a computing device that may determine according to a detection signal of the sensor. For example, the device may be provided in the power supply control device 16, may be integrally provided in the electronic control unit 27 of the second power supply system 20 to be described later, or may be realized by newly setting other microcomputers.

The third electrical connection box 19 of the first power supply system 10 is disposed in the section A5 and is connected to the second electrical connection box 14 via the third power supply line W13. In the third electrical connection box 19, electricity is relayed by the second electrical connection box 14, and electricity is supplied from the alternator 11. The accessory D1 and the accessory D2 are connected to the third electrical connection box 19, and the third electrical connection box 19 supplies electricity to both the accessory D1 and the accessory D2.

Similarly, the accessory D2 is also electrically connected to a third electric connection box 29 of the second power supply system 20 to be described later and is provided so as to be supplied with electricity from the second power supply system 20.

In this manner, in the first power supply system 10, the first to third power supply lines W11, W12, and W13 are provided, connected to the alternator 11, and disposed on the left side in the width direction of the vehicle V, that is, in the sections A1, A3, and A5. Then, the first to third power lines W11, W12, and W13 transmit the electricity from the alternator 11 to the first to third electrical connection boxes 13, 14, and 19, respectively.

Next, the second power supply system 20 will be described.

Like the first power supply system 10, the second power supply system 20 is configured to include the lead battery (second power supply) 21, a relay circuit 22, first, second, and third electrical connection boxes 23, 24, and 29, first and second power supply lines W21 and W22 for electrically connecting the lead battery 21 and the first and second electric connection boxes 23 and 24, and the third power supply line W23 for electrically connecting the lead battery 21 and the second and third electrical connection boxes 24 and 29.

The lead battery 21 is disposed in the section A2 and is provided to be grounded. The lead battery 21 is charged by a generator such as the alternator 11 so that the battery capacity does not decrease.

In the present embodiment, the lead battery 21 is used as the second power supply, but the invention is not limited thereto. It is possible to appropriately use a generator, a storage battery such as a lithium-ion battery, or the like as long as it has the function of a power supply. The lead battery 21 is normally not supplied with electricity, but is switched so as to be supplied with electricity when an abnormality occurs.

The first electrical connection box 23 of the second power supply system 20 is disposed in the section A2 and is connected to the lead battery 21 via the relay circuit 22 and the first power supply line W21 and is directly supplied with electricity from the lead battery 21. Like the first electrical connection box 13 of the first power supply system 10, the accessory D1 is connected to the first electrical connection box 23.

The second electrical connection box 24 of the second power supply system 20 is disposed in the section A4 and is connected to the lead battery 21 via the relay circuit 22 and the second power supply line W22 and is directly supplied with electricity from the lead battery 21. Both the accessory D1 and the accessory D2 are connected to the second electrical connection box 24.

Like the first power supply system 10, the second electrical connection box 24 includes the reverse power MOSFET 25 constructing a part of the power semiconductor, a power supply control device 26 (control unit), the electronic control unit 27 (control unit), and a relay circuit 28.

The power supply control device 26, the electronic control unit 27, and the relay circuit 28 have the same functions as those of the first power supply system 10.

As described above, the reverse power MOSFET 25 functions as an electric switch together with the forward power MOSFET 15 of the first power supply system 10 to switch between short-circuiting and opening of the entire connection power line W3 (third power supply line) to be described later according to the command values of the electronic control units 17 and 27 of the first or second power supply systems 10 and 20.

In an initial state, that is, in a normal state in which the electronic control units 17 and 27 do not detect breakage of the power supplies 11 and 21, the power semiconductor (both of the forward power MOSFET 15 and the reverse power MOSFET 25) is short-circuited by being turned on. In this initial state, electricity generated mainly by the alternator 11 is supplied to both the first and second power supply systems 10 and 20, and electricity is supplied from the lead battery 21 when supply by the alternator 11 is not enough.

The connection power supply line W3 is disposed between these power MOSFETs 15 and 25. In other words, the connection power supply line W3 is connected to the power supply lines W11, W12, and W13 of the first power supply system 10 at one end thereof and is connected to the power supply lines W21, W22 and W23 of the second power supply system 20 at the other end thereof, respectively, in terms of an electric circuit. The power semiconductor configured with the forward power MOSFET 15 and the reverse power MOSFET 25 is provided as an electric switch circuit interposed in the connection power supply lines W3 to switch between short-circuiting and opening of the power supply line W3.

The third electrical connection box 29 of the second power supply system 20 is disposed in the section A6 and is connected to the second electrical connection box 24 via the third power supply line W23. Then, in the third electric connection box 29, electricity is relayed by the second electric connection box 24, and electricity is supplied from the lead battery 21. The accessory D1 and the accessory D2 are connected to the second electrical connection box 29.

<Operation of Vehicular Power Supply System>

Figure 2:
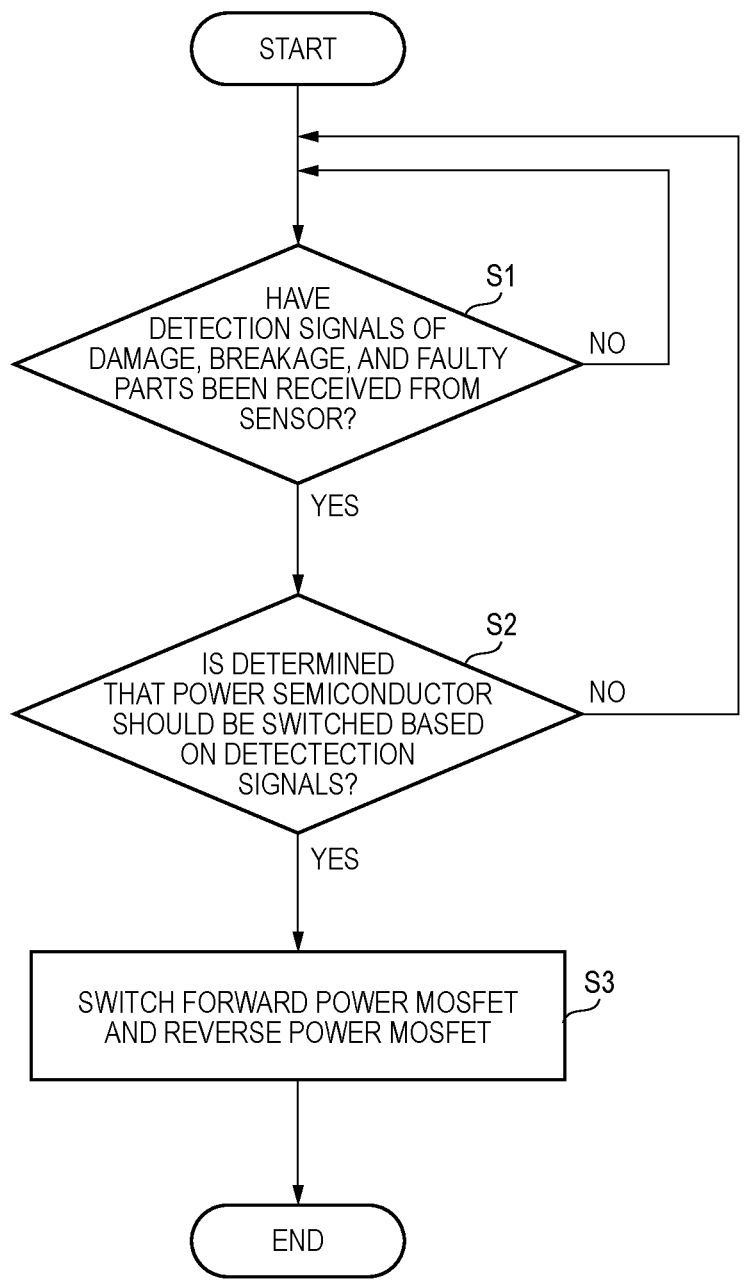
FIG. 2 is a flowchart for illustrating an operation of a control unit illustrated in FIG. 1.

Next, the operation of the vehicular power supply system 1 of the present embodiment will be described with reference to FIG. 2. FIG. 2 is a flowchart for illustrating the operation of the electronic control units 17 and 27 (control units) illustrated in FIG. 1.

As illustrated in FIG. 2, in step S1, the electronic control units 17 and 27 receive detection signals from the sensor mounted on the vehicle, other control devices or the accessories D1 and D2 and the like. The electronic control units 17 and 27 determine whether or not the detection signals such as damage of the power supplies 11 and 21 or breakage of the power supply lines W11, W12, W13, W21, W22, and W23, and faulty parts are received among the detection signals. As a result of this determination, if it is determined that a fault detection signal has been received (YES), the process proceeds to step S2. On the other hand, if it is determined that a fault detection signal is not received (NO), the process returns to the first step (START).

In step S2, the electronic control units 17 and 27 determine whether to turn off the forward power MOSFET 15 and the reverse power MOSFET 25 to switch to the open state based on the fault detection signal. As a result of this determination, if it is determined that the electronic control units 17 and 27 are to be switched (YES), the process proceeds to step S3. On the other hand, if it is determined that there is no need to switch (NO), the process returns to the first step (START).

In step S3, the electronic control units 17 and 27 generate command values for opening the connection power supply line W3 to the forward power MOSFET 15 and the reverse power MOSFET 25. The forward power MOSFET 15 and the reverse power MOSFET 25 are opened by being turned off according to these command values. As a result, electricity is cut off between the first power supply system 10 and the second power supply system 20.

In this way, when one of the power supplies 11 and 21 or the power lines W11, W12, W13, W21, W22, and W23 is damaged or broken and stops functioning, the forward power MOSFET 15 and the reverse power MOSFET 25 are switched to be open so that electricity is cut off between the first power supply system 10 and the second power supply system 20 by executing a series of steps from step S1 to step S3. Even in this case, even if the electricity supply from one of the power supplies 11 and 21 is disabled, electricity is supplied from the other power supplies 11 and 21 to the accessory D2 such as devices and equipment constituting accessories related to a drive system, for example, a system highly related to an automatic driving system, an electric power steering system, an anti-lock brake system, an advanced exercise support system, or the like. As a result, it is possible to avoid the stoppage of the automatic driving system as much as possible regardless of damage or breakage state.

<State of Supplementary Electricity by Power Semiconductor>

Figure 3:
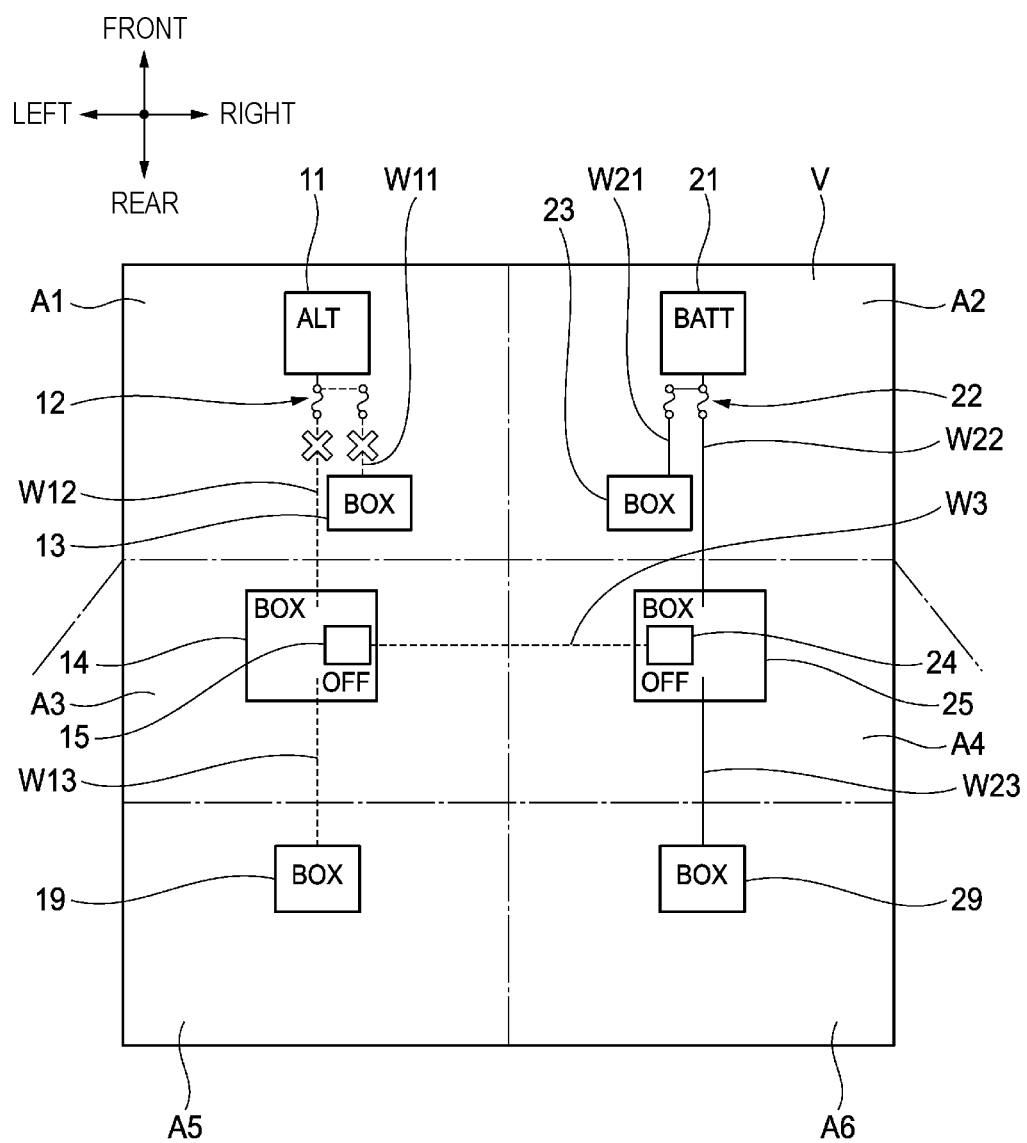
FIG. 3 is a schematic diagram for illustrating how breakage of a power supply line occurs in a section A1 illustrated in FIG. 1.
Figure 4:
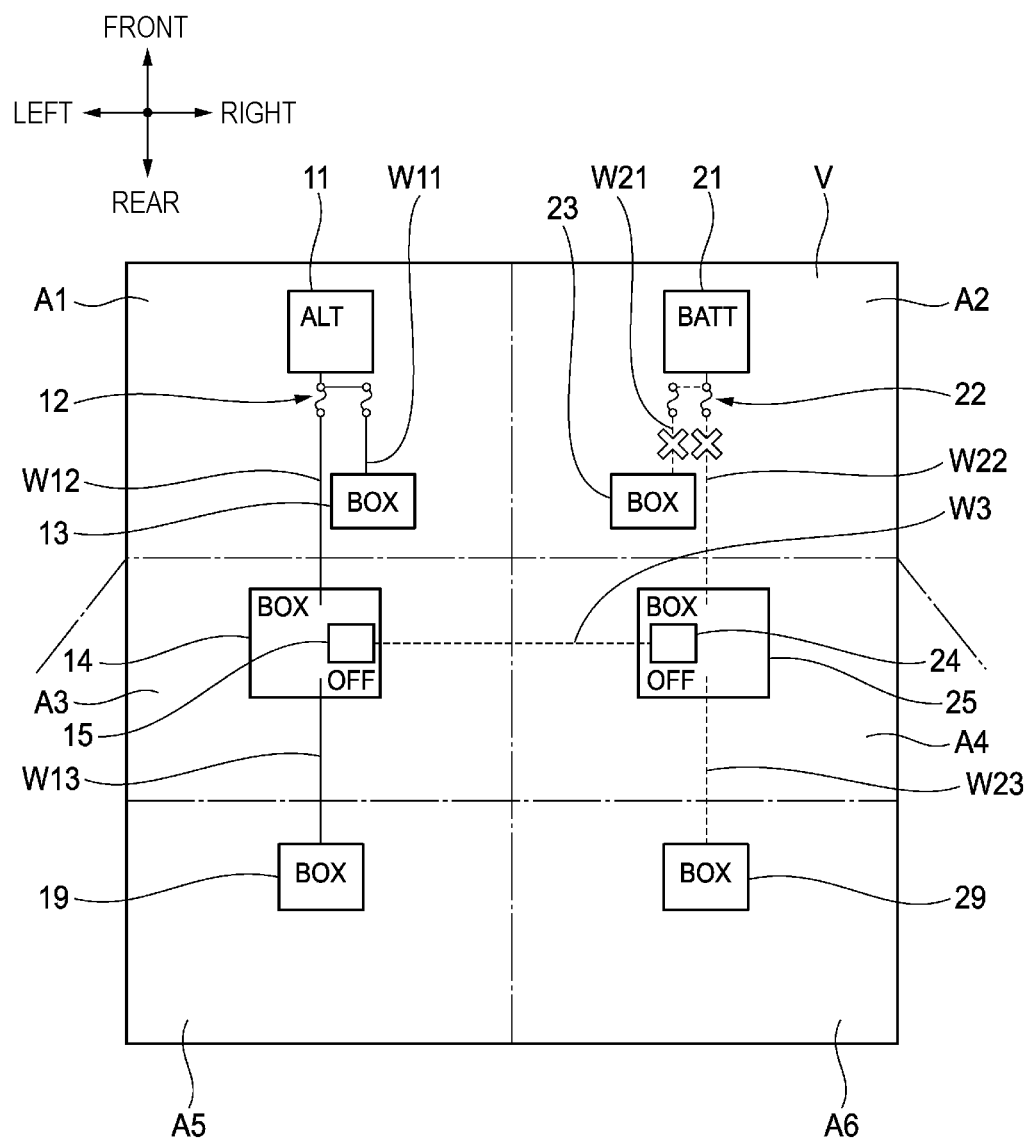
FIG. 4 is a schematic diagram for illustrating how breakage of a power supply line occurs in a section A2 illustrated in FIG. 1.
Figure 5:
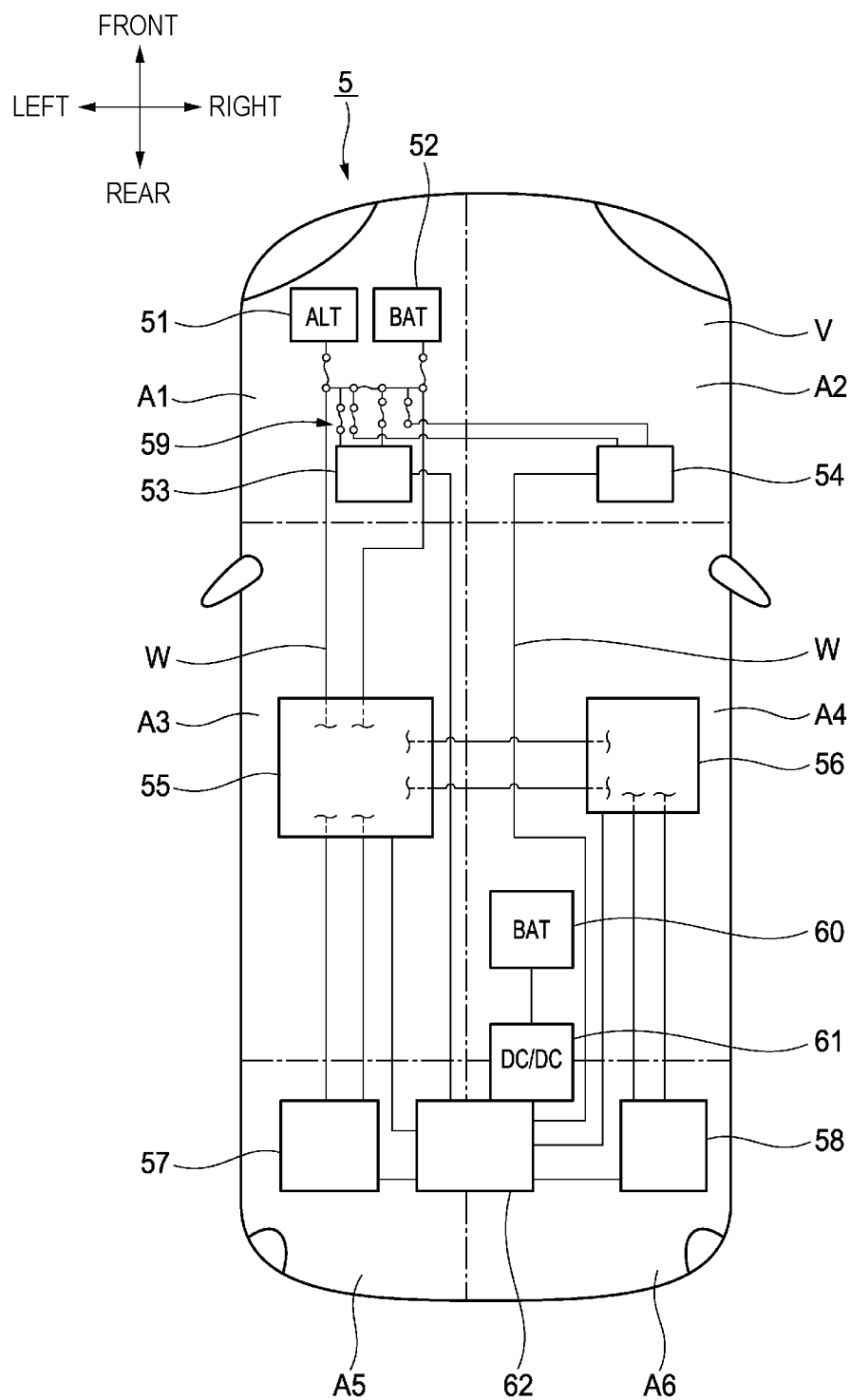
FIG. 5 is a schematic configuration diagram illustrating a vehicular power supply system of related art.

With reference to FIGS. 3 and 4, how electricity is supplied when power supply lines W11, W12, W13, W21, W22, and W23 of one power supply system 10 and 20 are broken will be described. FIG. 3 is a schematic diagram for illustrating how breakage of the power supply lines W11 and W12 occurs in the section A1 illustrated in FIG. 1. FIG. 4 is a schematic diagram for illustrating how breakage of the power supply lines W21 and W22 occurs in the section A2 illustrated in FIG. 1.

As illustrated in FIG. 3, in this case, breakage occurs in the first and second power supply lines W11 and W12 of the first power supply system 10. In this case, no electricity is supplied from the alternator 11, and the accessories D1 and D2 electrically connected to the first power supply system 10 may be stopped in the state as they are. There is a possibility that an abnormal current may occur as the power lines W11 and W12 are damaged.

Therefore, the electronic control units 17 and 27 generates command values (OFF) for switching the forward power MOSFET 15 and the reverse power MOSFET 25 to be open according to the state of breakage of the power supply lines W11 and W12 detected by the sensor. Then, according to the command values, the forward power MOSFET 15 and the reverse power MOSFET 25 are turned off, and the connection power supply line W3 is switched to an open state.

As a result, even if power supply from the alternator 11 is disabled in the first power supply system 10, power supply from the lead battery 21 is maintained in the second power supply system 20. In other words, even if the electricity supply from the power supply 11 is disabled, electricity is supplied from the power supply 21 to the accessory D2 such as devices and equipment constituting accessories related to a drive system, for example, a system highly related to an automatic driving system, an electric power steering system, an anti-lock brake system, an advanced exercise support system, or the like. As a result, it is possible to avoid the stoppage of the automatic driving system as much as possible regardless of damage or breakage state.

Next, a case different from FIG. 3 will be described.

As illustrated in FIG. 4, in this case, breakage occurs in the first and second power supply lines W21 and W22 of the second power supply system 20. In this case, there is a possibility that an abnormal current occurs as power supply lines W21 and W22 are damaged.

Therefore, the electronic control units 17 and 27 generates command values (OFF) for switching the forward power MOSFET 15 and the reverse power MOSFET 25 to be open according to the state of breakage of the power supply lines W21 and W22 detected by the sensor. Then, according to the command values, the forward power MOSFET 15 and the reverse power MOSFET 25 are turned off, and the connection power supply line W3 is switched to an open state.

As a result, even if power supply from the lead battery 21 is disabled in the second power supply system 20, power supply from the alternator 11 is maintained in the first power supply system 10. In other words, even if the electricity supply from the power supply 21 is disabled, electricity is continuously supplied from the power supply 11 to the accessory D2 such as devices and equipment constituting accessories related to a drive system, for example, a system highly related to an automatic driving system, an electric power steering system, an anti-lock brake system, an advanced exercise support system, or the like. As a result, it is possible to avoid the stoppage of the automatic driving system as much as possible regardless of damage or breakage state.

<Advantages of Vehicular Power Supply System of Present Embodiment>

The vehicular power supply system 1 of the present embodiment includes an alternator 11 (first power supply) mounted on the vehicle V, the power lines W11, W12, and W13 (first power supply line) of the first power supply system 10 connected to the alternator 11 and disposed in the sections A1, A3, and A5 (one side in the width direction or the front-rear direction) of the vehicle V, the lead battery 21 (second power supply different from the first power supply) mounted on the vehicle V, the power lines W21, W22, and W23 (second power supply line) of the second power supply system 20 connected to the lead battery 21 and disposed in A2, A4, and A6 (the other side in the width direction or the front-rear direction) of the vehicle V, the connection power supply line W3 (third power supply line) connected to the power supply lines W11, W12, and W13 of the first power supply system 10 at one end thereof and connected to the power supply lines W21, W22, and W23 of the second power supply system 20 at the other end thereof, and a power semiconductor (forward power MOSFET 15 and reverse power MOSFET 25) that switches between short-circuiting and opening of the connection power supply line W3. Therefore, even if the vehicle V crashes, it is possible to reduce the risk of both the alternator 11 and the lead battery 21 or the power supply lines W11, W12, W13, W21, W22, and W23 being broken or damaged and at the same time, to realize complementarity between these power supply systems 10 and 20 to improve power supply redundancy of the system. It is possible to reduce the number of electric lines to be used and to simplify the routing and to reduce the weight and cost of the system.

Particularly, according to the vehicular power supply system 1 of the present embodiment, the power supply lines W11, W12, W13, W21, W22, and W23 (first and second power supply lines) of the first and second power supply systems 10 and 20 are disposed apart from each other in the width direction of the vehicle V. Therefore, even if the vehicle V collides at any position in the front, rear, left, and right, the alternator 11, the lead battery 21, or the power lines W11, W12, W13, W21, W22, and W23 thereof may be prevented from being broken or damaged at the same time. As a result, even if electric supply from one of the power supplies 11 and 21 is disabled, electricity is supplied from the other of the power supplies 11 and 21 to the accessory D2 such as devices and equipment constituting accessories related to a drive system, for example, a system highly related to an automatic driving system, an electric power steering system, an anti-lock brake system, an advanced exercise support system, or the like. As a result, it is possible to avoid the stoppage of the automatic driving system as much as possible regardless of damage or breakage state. In this way, it is possible to reduce the risk that electricity is not supplied to the accessories related to the drive system and all functions are stopped.

According to the vehicular power supply system 1 of the present embodiment, the power semiconductor is configured with the forward power MOSFET 15 and the reverse power MOSFET 25, one of the forward power MOSFET 15 and the reverse power MOSFET 25 is provided on one end side of the connection power supply line W3 (third power supply line), and the other of the forward power MOSFET 15 and the reverse power MOSFET 25 is provided on the other end side of the connection power supply line W3. For this reason, even when a large amount of electricity is supplied to the connection power supply line W3, it is possible to switch the electric supply to the connection power supply line W3.

According to the present embodiment, the vehicular power supply system 1 further includes the second electrical connection box (first electrical connection box) 14 of the first power supply system 10 electrically connected to the alternator 11 (first power supply) and provided with one of the forward power MOSFET 15 and the reverse power MOSFET 25, and the second electrical connection box 24 (second electrical connection box) of the second power supply system 20 electrically connected to the lead battery 21 (second power supply) and provided with the other of the forward power MOSFET 15 and the reverse power MOSFET 25. Therefore, it is possible to distribute electricity from the other power supply to the plurality of accessories D1 and D2, the device, or the like via the electrical connection boxes 14 and 24.

According to the vehicular power supply system 1 of the present embodiment, electricity is supplied to a plurality of accessories D1 and D2 mounted on the vehicle V, and at least a part of the plurality of accessories D1 and D2, that is the accessory D2 is provided so as to be supplied with electricity from both of the electrical connection boxes 13, 14, 19, 23, 24, and 29 (first and second electrical connection boxes) of the first and second power supply systems 10 and 20, respectively. Therefore, for example, when the accessory D2 is a system highly related to an automatic driving system, an electric power steering system, an anti-lock brake system, an advanced exercise support system, or the like, electricity is directly supplied from the other power supplies 11 and 21 even if electricity supply from one of the power supplies 11 and 21 is disabled. As a result, it is possible to avoid the stoppage of the automatic driving system as much as possible regardless of damage or breakage state.

According to the present embodiment, the vehicular power supply system 1 further includes the electronic control units 17 and 27 (control units) for generating command values for switching between short-circuiting and opening of the connection power supply line W3 (third power supply line) with respect to the power semiconductor (forward power MOSFET 15 and reverse power MOSFET 25) according to detected faulty parts of the vehicle V, a damage state of the alternator 11 or the lead battery 21 (first or second power supply), or a breakage state of power supply lines W11, W12, W13, W21, W22, and W23 (first or second power supply line) of the first or second power supply system 10, 20. The power semiconductor switches between short-circuiting and opening of the connection power supply line W3 according to the command values of the electronic control units 17 and 27. For this reason, the electronic control units 17 and 27 appropriately switch between short-circuiting and opening of the power semiconductor according to the faulty parts, the damage or the breakage state, and therefore unnecessary switching of the power semiconductor may be suppressed.

That is, with such a configuration, even if one of the power supplies 11 and 21 or the power supply lines W11, W12, W13, W21, W22, and W23 thereof stop functioning due to a vehicle crash, the remaining power supplies 11 and 21 and the power supply lines W11, W12, W13, W21, W22, and W23 allow the system to function as a whole. In other words, it is possible to realize complementarity between the power supply systems 10 and 20 to improve power supply redundancy of the system. Since it is unnecessary to directly extend the power supply lines from the power supplies 11 and 21 to all the electrical connection boxes 13, 14, and 19 mounted on the vehicle V, it is possible to omit a part of the power supply lines and to simplify the routing and to reduce the weight and cost of the system.

Although the concrete embodiments have been described above, aspects of the present invention are not limited to these embodiments, and variations, improvements, and the like may be made as appropriate.

Here, the features of the embodiment of the vehicular power supply system according to the present invention described above are summarized briefly in the following [1] to [5], respectively.

[1] A vehicular power supply system (1) comprising:
a first power supply (alternator, 11) mounted on a vehicle (V);
a first power supply line (a power supply line W21, W22, or W23 of a first power supply system 10) connected to the first power supply (alternator 11) and disposed on one side in a width direction or a front-rear direction of the vehicle (V);
a second power supply (lead battery 21) mounted on the vehicle (V), that is different from the first power supply (alternator 11);
a second power supply line (a power supply line W21, W22, or W23 of a second power supply system 20) connected to the second power supply (lead battery 21) and disposed on another side in the width direction or the front-rear direction of the vehicle (V);
a third power supply line (connection power supply line W3) in which one end is connected to the first power supply line (a power supply line W11, W12, or W13 of the first power supply system 10) and another end is connected to the second power supply line (a power supply line W21, W22, or W23 of the second power supply system 20); and
a power semiconductor (forward power MOSFET 15 or reverse power MOSFET 25) that switches between short-circuiting and opening of the third power supply line (connection power supply line, W3).

[2] The vehicular power supply system (1) according to [1], wherein the power semiconductor (forward power MOSFET 15 and reverse power MOSFET 25) includes a forward power MOSFET (15) and a reverse power MOSFET (25), and wherein one of the forward power MOSFET (15) and the reverse power MOSFET (25) is provided on one end side of the third power supply line (connection power supply line W3) and the other of the forward power MOSFET (15) and the reverse power MOSFET (25) is provided on another end side of the third power supply line (connection power supply line W3).

[3] The vehicular power supply system (1) according to [2], further comprising:
a first electrical connection box (a second electrical connection box 14 of the first power supply system 10) electrically connected to the first power supply (alternator 11) and provided with one of the forward power MOSFET (15) and the reverse power MOSFET (25); and
a second electrical connection box (a second electrical connection box 24 of the second power supply system 20) electrically connected to the second power supply (lead battery 21) and provided with the other of the forward power MOSFET (15) and the reverse power MOSFET (25).

[4] The vehicular power supply system (1) according to [3], wherein electricity is supplied to a plurality of accessories (D1 and D2) mounted on the vehicle (V), and wherein at least a part (D2) of the plurality of accessories (D1 and D2) is positioned so that the electricity is supplied from both of the first electrical connection box and second electrical connection box (the second electrical connection box 14 of the first power supply system 10 and the second electrical connection box 24 of the second power supply system 20).

[5] The vehicular power supply system (1) according to any one of [1] to [4], further comprising:
control units (electronic control units, 17 and 27) generating command values to the power semiconductor (forward power MOSFET 15 and reverse power MOSFET 25) for switching between short-circuiting and opening of the third power supply line (connection power supply line W3), according to a detected faulty part of the vehicle (V), a damage state of the first power supply or the second power supply (alternator 11 or lead battery 21), or a breakage state of the first power supply line or the second power supply line (a power line W11, W12, or W13 of the first power supply system 10 or a power supply line W21, W22, or W23 of the second power supply system 20), wherein the power semiconductor (forward power MOSFET 15 and reverse power MOSFET 25) switches between short-circuiting and opening of the third power supply line (connection power supply line W3) according to the command values of the control units (electronic control units 17 and 27).

DESCRIPTION OF REFERENCE NUMERALS AND SIGNS

1: vehicular power supply system
10: first power supply system
11: alternator (first power supply)
12: relay circuit
13: first electrical connection box
14: second electrical connection box (first electrical connection box)
15: forward power MOSFET
16: power supply control device
17: electronic control unit (control unit)
18: relay circuit
19: third electrical connection box 20: second power supply system
21: lead battery (second power supply)
22: relay circuit
23: first electrical connection box
24: second electrical connection box (second electrical connection box)
25: reverse power MOSFET
26: power supply control device
27: electronic control unit (control unit)
28: relay circuit
29: third electrical connection box
5: vehicular power supply system
51: alternator
52: lead battery
53: first electrical connection box
54: second electrical connection box
55: third electrical connection box
56: fourth electrical connection box
57: fifth electrical connection box
58: sixth electrical connection box
59: relay circuit
60: lithium-ion battery
61: DC/DC converter
62: electric distribution box
V: vehicle
A1: section (left side section of engine compartment)
A2: section (right side section of engine compartment)
A3: section (left side section of floor)
A4: section (right side section of floor)
A5: section (left-side section of the section of rear)
A6: section (right-side section of the section of rear)
W: power supply line
W11: first power supply line (first power supply line)
W12: second power supply line (first power supply line)
W13: third power supply line (first power supply line)
W21: first power supply line (second power supply line)
W22: second power supply line (second power supply
W23: third power supply line (second power supply
W3: connection power supply line (third power supply
D1: accessory
D2: accessory

What is claimed is:

1. A vehicular power supply system comprising:
a first power supply mounted on a vehicle;
a first power supply line connected to the first power supply and disposed on one side in a width direction or a front-rear direction of the vehicle;
a second power supply mounted on the vehicle, that is different from the first power supply;
a second power supply line connected to the second power supply and disposed on another side in the width direction or the front-rear direction of the vehicle;
a third power supply line in which one end is connected to the first power supply line and another end is connected to the second power supply line;
a power semiconductor that switches between short-circuiting and opening of the third power supply line; and
control units generating command values to the power semiconductor so as to switch from short-circuiting to opening of the third power supply line when a breakage state of the first power supply line or the second power supply line occurs,
wherein the power semiconductor switches between short-circuiting and opening of the third power supply line according to the command values of the control units.

2. The vehicular power supply system according to claim 1,
wherein the power semiconductor includes a forward power MOSFET and a reverse power MOSFET, and
wherein one of the forward power MOSFET and the reverse power MOSFET is provided on one end side of the third power supply line and the other of the forward power MOSFET and the reverse power MOSFET is provided on another end side of the third power supply line.

3. The vehicular power supply system according to claim 2, further comprising:
a first electrical connection box electrically connected to the first power supply and provided with one of the forward power MOSFET and the reverse power MOSFET; and
a second electrical connection box electrically connected to the second power supply and provided with the other of the forward power MOSFET and the reverse power MOSFET.

4. The vehicular power supply system according to claim 3,
wherein electricity is supplied to a plurality of accessories mounted on the vehicle, and
wherein at least a part of the plurality of accessories is positioned so that the electricity is supplied from both of the first electrical connection box and the second electrical connection box.

5. The vehicular power supply system according to claim 1,
wherein the first power supply and the second power supply are both disposed in a first section of the vehicle and the power semiconductor is disposed in a second section of the vehicle that is different from the first section.

6. The vehicular power supply system according to claim 5,
wherein the first section of the vehicle is disposed at a front or rear of the vehicle.

7. The vehicular power supply system according to claim 6,
wherein the second section of the vehicle is disposed between a front end and a rear end of the vehicle.

8. The vehicular power supply system according to claim 6,
wherein the second section of the vehicle is disposed between a left side and a right sight of the vehicle.

9. The vehicular power supply system according to claim 6,
wherein the first section of the vehicle is disposed in an engine compartment and the second section of the vehicle is disposed between the engine compartment and a rear of the vehicle.

10. The vehicular power supply system according to claim 6,
wherein the first power supply is disposed on one side of the first section of the vehicle in the width direction and the second power supply is disposed on another side of the first section of the vehicle in the width direction.

11. The vehicular power supply system according to claim 10,
wherein the second section of the vehicle is disposed between a front end and a rear end of the vehicle.

* * * * *